United States Patent [19]

Coufal et al.

[11] Patent Number: 5,114,913

[45] Date of Patent: May 19, 1992

[54] MAGNETIC HEAD SLIDER EMPLOYING SUPERCONDUCTOR FOR LEVITATION

[75] Inventors: Hans J. Coufal; Mason L. Williams, III, both of San Jose, Calif.

[73] Assignee: International Business Machines Corporation, Armonk, N.Y.

[21] Appl. No.: 516,381

[22] Filed: Apr. 30, 1990

Related U.S. Application Data

[63] Continuation-in-part of Ser. No. 331,056, Mar. 28, 1989, which is a continuation of Ser. No. 155,328, Feb. 12, 1988, abandoned.

[51] Int. Cl.⁵ .................. H01B 12/00; G11B 5/60
[52] U.S. Cl. .................. 505/1; 360/103; 360/104; 360/122
[58] Field of Search .............. 505/876, 826, 829, 1; 360/102, 103, 104, 122, 105, 130.1, 129, 106, 97.01, 97.02

[56] References Cited

U.S. PATENT DOCUMENTS 4,843,504  6/1989  Barnes ................. 360/106

Primary Examiner—Robert S. Tupper
Assistant Examiner—Andrew L. Sniezek
Attorney, Agent, or Firm—Otto Schmid, Jr.

[57] ABSTRACT

A slider assembly for supporting a magnetic head a small uniform spacing above the surface of a magnetic recording medium comprising a slider body having a layer of superconducting material on the surface of the slider assembly which faces the surface of the magnetic recording medium. The slider assembly is maintained in a vacuum of a predetermined level or in a predetermined gas, and the slider assembly is cooled to a temperature below the critical temperature of the superconductor material so that the slider assembly and the magnetic transducer are levitated to a small uniform spacing above the surface of the magnetic recording medium due to magnetic forces between the magnetized magnetic recording medium and the layer of superconducting material.

16 Claims, 3 Drawing Sheets $Y = -(2h + t + \lambda)$
$Y = -(2h + \lambda)$ (IMAGE HAS SAME SIGN)

$h$ = HEIGHT
$Y = 0$
$Y = 1$ $M(X) = M \sin(KX)$

MAGNETIC HEAD SLIDER EMPLOYING SUPERCONDUCTOR FOR LEVITATION

CROSS-REFERENCES TO RELATED APPLICATIONS

This is a continuation-in-part of application Ser. No. 07/331,056, filed Mar. 28, 1989, which is a continuation of application Ser. No. 07/155,328, filed Feb. 12, 1988, now abandoned.

BACKGROUND OF THE INVENTION

1. Field of the Invention

This invention relates to a magnetic head slider assembly, and more particularly to a magnetic head slider which utilizes a superconducting layer to maintain a close spacing between the magnetic head and a magnetic recording surface.

2. Description of the Prior Art

Magnetic head assemblies that fly relative to magnetic media have been used extensively. These assemblies provide a noncontact transducing relationship between a magnetic transducer and a magnetic recording medium, such as a rotating magnetic disk, so that a stable constant spacing can be maintained between the transducer and the disk. This stable constant spacing has been maintained in prior art systems by means of an air bearing slider by which the magnetic transducer is supported. One example of an air bearing slider is commonly assigned U.S. Pat. No. 4,475,135 to Warner et al. As is known in the art, the steady state flying characteristics of an air bearing slider are determined by the bearing geometry, the fluid dynamics of air between the slider and the spinning disk, and the mechanical properties of the suspension system.

It is also known in the art that, to provide reliable data detection, the head-disk interface must possess adequate bearing stiffness to provide separation stability within about ten percent in the face of axial accelerations and adequate pitch and roll stiffness to avoid contact with the disk during radial acceleration associated with track accessing.

Recent progress in high temperature superconducting materials has encouraged practical applications of such materials. One important phenomena associated with superconducting materials is ideal diamagnetism, the so-called Meissner Effect. This phenomena relates to the fact that, within a superconductor, no appreciable magnetic field exists, up to a critical field, which is a function of temperature. An ideal diamagnet, such as a superconductor, can be described as a magnetic mirror. A magnet and its mirror repel each other, however, with a force that is proportional to the square of (Magnetization$_z$/Distance), with the subscript z indicating that only the magnetic field component perpendicular to the surface of the superconductor contributes to the force. This force, which is independent of the polarity of the magnet, enables levitation of a magnet over a superconducting surface or levitation of a superconductor over a magnet. This force acts like a progressive spring with instantaneous response. However, it can be shown that the stiffness of a uniform permanent magnet over a superconducting surface vanishes for spacings small compared to the magnet size; that is, the force becomes constant so that there is nothing to control the separation.

The prior art has not shown a levitation bearing which has either adequate bearing stiffness to maintain a suitable separation stability or adequate pitch and roll stiffness to the extent that such a bearing can be used in a magnetic disk storage apparatus.

SUMMARY OF THE INVENTION

It is the principal object of this invention to provide a magnetic recording head slider in which a stable separation between the slider and a magnetic recording medium is maintained by magnetic levitation produced by a superconducting layer on the slider and a recorded magnetic field.

In accordance with the invention, a slider assembly for supporting a magnetic recording head at a predetermined uniform spacing with respect to the surface of a magnetic recording medium comprises a slider body having a first surface which faces the magnetic recording medium, and a layer of superconducting material is provided on this surface of the slider body. A magnetic recording head is provided on a second surface of the slider body, and the slider assembly is maintained in a vacuum of a predetermined level. A cooling means is provided for cooling the slider assembly to a temperature below the critical temperature of the superconductor material so that the slider and the magnetic recording head are levitated to a predetermined small uniform spacing above the surface of the magnetic recording medium due to magnetic forces between the magnetized magnetic recording medium and the layer of superconducting material.

In a further embodiment, the slider assembly is maintained in the presence of a predetermined gas.

In a specific embodiment, the slider assembly is cooled to a temperature of 77K, and the superconducting material comprises an oxide ceramic superconductor.

The foregoing and other objects, features and advantages of the invention will be apparent from the following more particular description of a preferred embodiment of the invention as illustrated in the accompanying drawings.

DESCRIPTION OF THE PREFERRED EMBODIMENT

The present invention will be described as applied to a magnetic disk storage apparatus, such as that shown schematically in FIG. 1.

Figure 1:
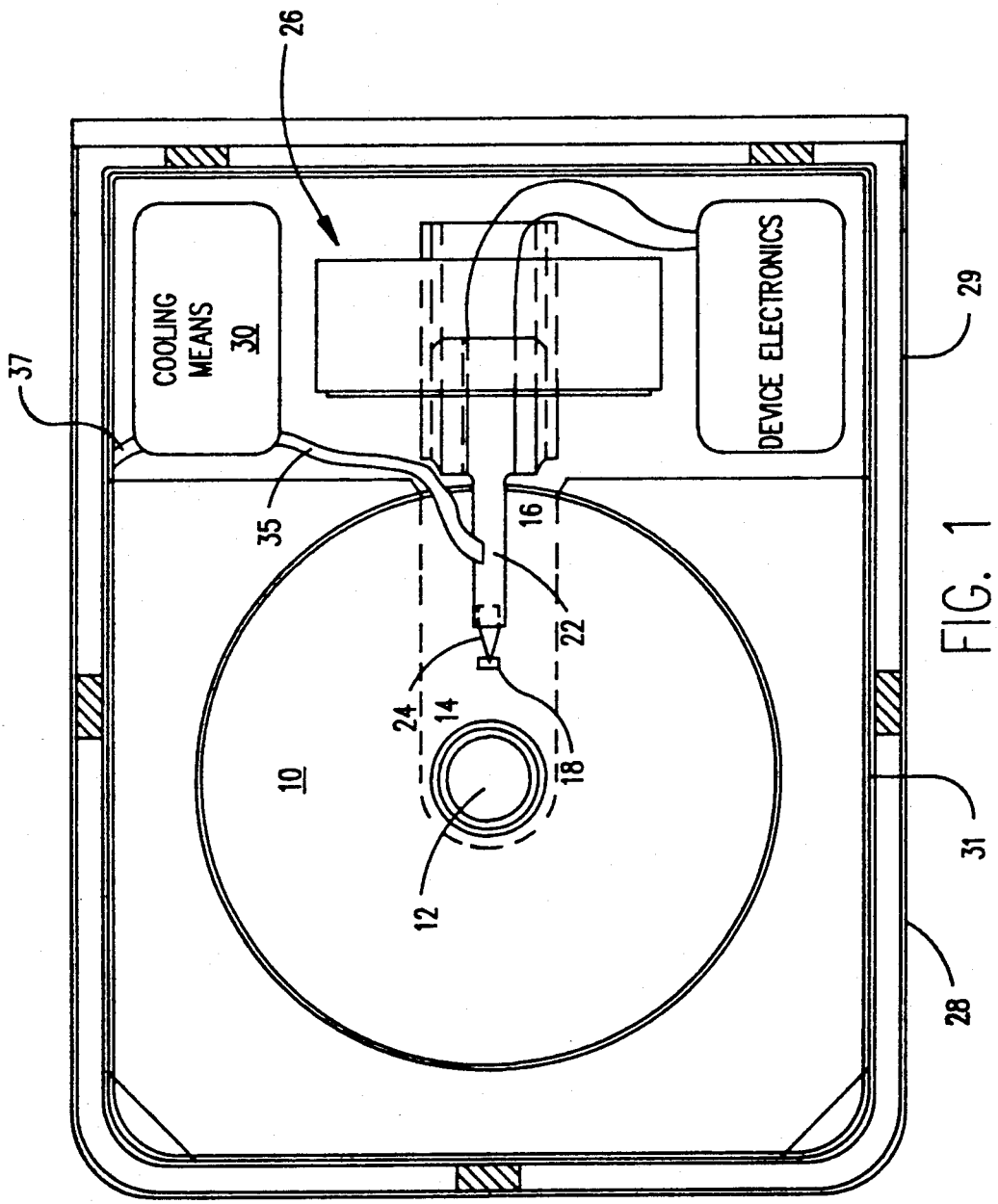
FIG. 1 is a simplified diagram of a disk file embodying the present invention which shows the accessing mechanism for a single disk surface.

In a magnetic disk file as shown in FIG. 1, a plurality of rigid rotatable disks, such as disk 10 are supported on a spindle 12 and rotated by a disk drive motor (not shown). The magnetic recording media on each disk is in the form of an annular pattern of concentric data tracks having an inside data band 14 and an outside data band 16, as shown on disk 10.

As the disks rotate, the sliders are moved radially in and out so that the heads may access different portions of the disk surfaces containing the data. Each slider 18 supports one or more read/write heads 20 (FIG. 2) and is attached to an actuator arm 22 by means of a suspension 24. The suspensions 24 provide a slight spring force which biases the sliders toward the disk surfaces. Each actuator arm 22 is attached to an accessing mechanism such as a voice coil motor (VCM) 26.

The above description of a typical disk file, and the accompanying illustration of it in FIG. 1, are for representative purposes only. It should be apparent that disk files may contain a large number of disks and VCMs and that each VCM may support a number of sliders. Alternatively, the disk file may contain only a single disk.

In contrast to prior art air bearing slider operation, the present invention eliminates the air from the disk file and regulates the spacing between head and disk by magnetic forces between the magnetized recording medium and a superconducting layer on the slider. These forces arise from the Meissner Effect which expels flux from the superconductor by establishing currents which cancel the field in the superconductor produced by the recorded magnetic transitions on the disk. Since the recorded alternating field such as, for example, data, generates a suitable field gradient, the spacing between the slider and the magnetic recording medium can be maintained to a stable value as will be discussed in greater detail below.

In operation, the slider assembly is first maintained at a temperature below the critical temperature of the superconducting material so that the slider assembly is levitated to a predetermined small uniform spacing above the surface of the magnetic recording medium. Then relative motion is started between the slider assembly and the surface of the magnetic recording medium. This operation has the advantage that the spacing between head and disk is independent of the relative velocity between the magnetic head slider and the disk. In addition, the spacing is maintained even when the disk is at rest.

The magnetic disk file, according to the present invention, is provided with a hermetically sealed enclosure 28 capable of holding a suitable gas at a suitable pressure. Enclosure 28 preferably is a double walled enclosure having an outer wall 29 which is vacuum tight and an inner wall 31 which is thermally insulated from the outer wall 29 by suitable means such as a vacuum. Inner wall 31 of enclosure 28 is connected to a cooling means and serves as a radiation shield which shields the cryogenic part of the magnetic disk file from room temperature radiation from outer wall 29. In operation, the sealed enclosure 28 is evacuated to a suitable vacuum such as $10^{-3}$ to $10^{-7}$ torr, for example, through a suitable port (not shown). After the desired pressure is reached, in an alternate embodiment, the sealed enclosure can be backfilled, if desired for improved heat transfer, with a suitable gas such as helium to a suitable pressure up to several hundred torr, for example. The chosen gas must not liquefy or solidify at the chosen temperature of the magnetic disk file.

In addition, a cooling means 30 is provided to cool the selected superconducting material to a temperature lower than the critical temperature, $T_c$, at which the selected material exhibits superconducting properties. Cooling means 30 may comprise any suitable apparatus for cooling to the desired temperature. One suitable cooling device utilizes a reservoir of liquid nitrogen. A second suitable cooling means comprises a refrigerator such as a closed cycle Sterling engine. A further example of the cooling means comprises a Thermo-Electric solid state cooling device. In the embodiment in which a vacuum is maintained within enclosure 28, transfer of heat from the slider is by way of conduction along the suspension 24, arm 22, and heat conduction path 35. A second heat conduction path 37 is also provided between cooling means 30 and the inner surface of sealed enclosure 28. Heat conduction paths 35 and 37 are suitable thermal conductors, preferably metals such as copper or aluminum. In the embodiment in which a gas is introduced into enclosure 28, the gas, such as helium, serves as an exchange gas for heat transfer by convection in addition to the heat transfer by conduction.

Within the past two years, a large number of superconducting materials have been described in the scientific literature having critical temperatures above 77 degrees K. In view of the disclosure of these materials, in a specific embodiment, cooling means 30 utilizes liquid nitrogen as the coolant, and this cooling means is capable of cooling the selected material to 77K. In this case, the gas chosen for sealed enclosure 28 must be one that neither liquifies nor solidifies at 77K. Possible choices are hydrogen, helium and neon. Safety concerns eliminate the flammable/explosive hydrogen as choice, and of the other two possible choices, helium was chosen in a specific embodiment.

Figures 2, 6A, 6B:
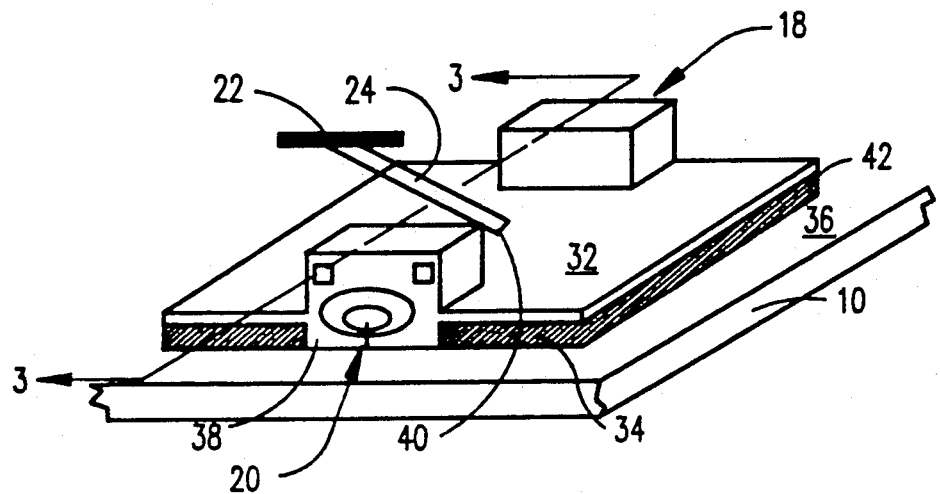
FIG. 2 is a three dimensional schematic view of the slider assembly embodying the present invention.
FIGS. 6a and 6b are diagrams showing the geometry for calculation of the force between a magnetized layer and a parallel superconductor.
Figure 3:
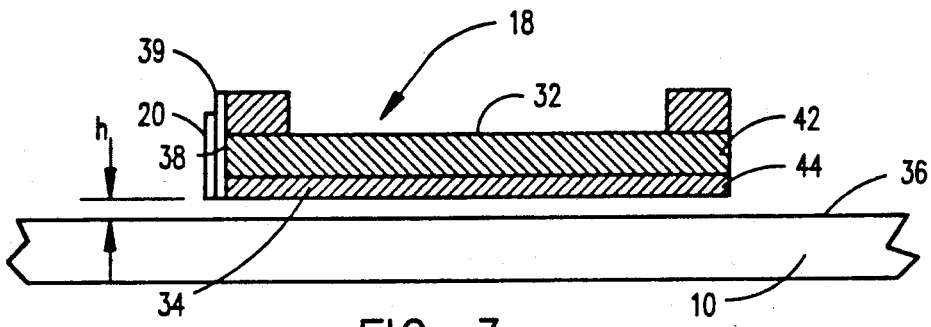
FIG. 3 is a cross-section view taken along line 3—3 of FIG. 2.

A specific embodiment of the slider, according to the present invention, is shown in FIGS. 2 and 3. The slider 18 comprises a body portion 32 which has a first surface 34 which faces and, in operation, is maintained a very small uniform spacing, h, from the surface 36 of the magnetic recording medium such as disk 10. The magnetic read/write head 20 is supported on a second surface 38 of slider 18 in a position so that the transducing gap is also supported a very small uniform distance from the surface 36 of the magnetic recording medium. If desired, a non-conductive layer 39 can be deposited on surface 38 prior to fabrication of read/write head 20. The suspension 24 is usually made of spring metal, such as beryllium copper, for example, and the suspension 24 is designed to provide an approximately constant force holding the slider 18 against the disk surface 36. The suspension is preferably attached at a position 40 which spans the center of mass of the slider 18. This attachment insures that accessing accelerations produce negligible torque tending to disturb the slider facing attitude to surface 36, while providing roll stability directly.

Figure 4:
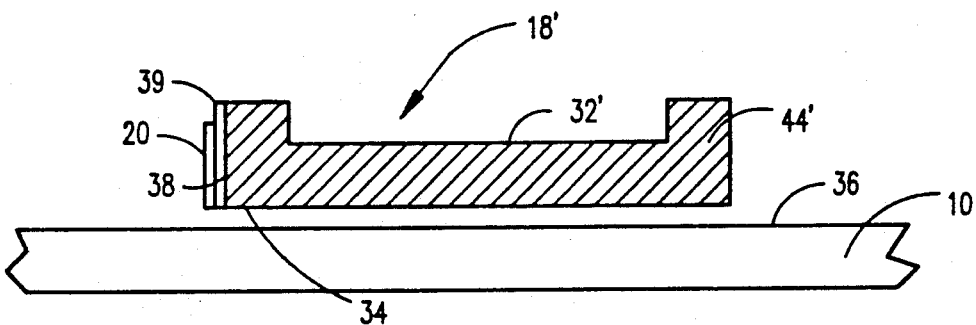
FIG. 4 is a cross-section view of an alternate embodiment of the slider assembly of FIGS. 2 and 3.

According to the preferred embodiment of the present invention, (FIG. 3) the body portion 32 of the slider comprises a first layer 42 of ceramic or similar material and a superconductor levitation layer 44 on the first surface 34 which faces the surface 36 of the magnetic recording medium. The superconductor levitation layer must have a thickness of at least several times (3 times or more) the penetration depth of a magnetic field into the superconductor for optimum performance. Alternatively, the superconductor levitation layer 44' may comprise the entire body portion 32' of the slider 18' as shown in FIG. 4.

Figure 5A:
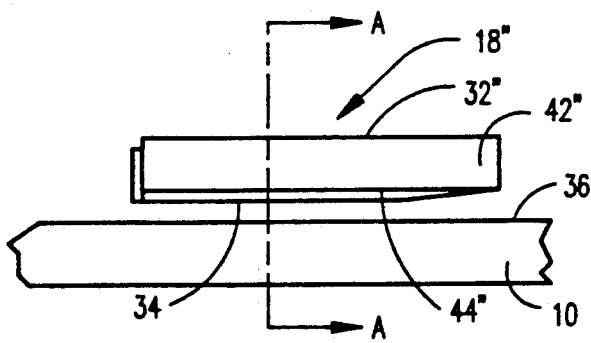
FIGS. 5a and 5b are cross-section views of another embodiment of the slider assembly of FIG. 2.
Figure 5B:
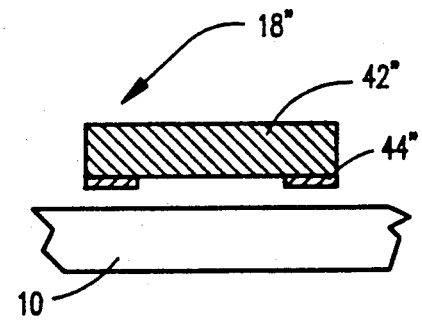

In cases in which a gas is introduced into the enclosure 28, the slider may be contoured in such a manner that the slider is maintained in the desired position relative to the recording medium by the combined effects of the levitation produced by the superconductor levitation layer and the aerodynamic effects produced by relative motion in the gas between the shaped slider and the recording medium. As shown in FIG. 5, the slider 18" comprises a body portion 32" in which the levitation layer 44" is shaped to form side rails and the end of the slider away from read/write head 20 is provided with a taper section. The remainder of body portion 32 is formed of a suitable ceramic or similar material 42".

In principle, any superconductor material having suitable mechanical properties can be used as the superconductor levitation layer 44. Examples of suitable low temperature superconductor materials include Niobium, Niobium$_3$-Tin, Niobium$_3$-Aluminum, and Niobium$_{0.79}$ (Aluminum$_{0.73}$ Germanium$_{0.27}$)$_{0.21}$. However, the preferred superconductor materials are those having a critical temperature, $T_c$, above 77K. An important class of these materials are the oxide ceramic superconductors. Specific materials which are known to have suitable properties so that they can be used as superconductor levitation layer 44 include Rare Earth Barium Copper Oxides (R Ba2 Cu3 O7), with the rare earth material R being Y, Nd, Sm, Eu, Gd, Dy, Ho, Er, Tm, Yb or Lu; Calcium Lanthanum Barium Copper Oxide (Ca La Ba Cu3 O7); and Bismuth Strontium Calcium Copper Oxide compounds.

The force between a sinusoidally magnetized layer and a parallel superconductor can be calculated by considering the image magnetization that is produced by the Meissner effect in the superconductor. The non-zero penetration depth, lambda, results in the apparent image being at a distance of twice the physical separation, h, plus the penetration depth. This means it will be difficult to achieve adequate stiffness if the penetration depth is more than a few times the desired nominal spacing. It is simplest to consider only a sinusoidally magnetized medium. The linearity of this problem allows the force for arbitrary magnetization to be calculated by adding the forces due to various Fourier components. It will be seen that it is desirable to limit the wavelength range of possible recorded data by using, for example, an appropriate run length limited code to ensure that there are no long distances with no transitions under the head body. The simplified geometry for the force calculation is in FIG. 6. In the figure, t is the thickness of the magnetized recording medium, $\lambda$ is the penetration depth of the superconductor, and h is the spacing between the magnetized recording medium and the superconductor. The field at the medium due to the image is given by $$H_{image} = 2\pi M \sin(kx) e^{-ky} e^{-k(2h+\lambda)} [1 - e^{-kt}],$$

where M is in emu/cc, k is $2\pi$ divided by the recorded wavelength, x is distance in the direction of the magnetization variation, and y is the distance (in the medium) from the surface of the medium closest to the superconductor.

The force in dynes is given by $$F = 2A\pi M^2 e^{-k(2h+\lambda)} [1 - e^{-kt}]^2,$$

where A is the area in sq cm.
The stiffness is given by $$C = \frac{dF}{dh} = 4kA\pi M2 e^{-k(2h+\lambda)} [1 - e^{-kt}]^2$$

For $kt \gg 1$, the maximum stiffness obtains when $k = (2h + \lambda)^{-1}$ and is given by $C_{max} = \frac{4A\pi M^2}{e(2h + \lambda)}$.

The maximum field from the medium at the location of the superconductor must be below the critical field $H_{c1}$, and this is given by $$2\pi M = H_{c1} \text{ so we may write } C_{max} = \frac{AH_{c1}^2}{\pi e(2h + \lambda)}.$$

The maximum mass per unit area supportable in the presence of acceleration a with tolerable height disturbance of Delta h is $$\frac{m}{A} = \frac{H_{c1}^2(\Delta h)}{\pi ea(2h + \lambda)}.$$

For 400 Oe critical field, 10 percent spacing tolerance, 1 G disturbing accelerations, and penetration depth = 3 times flying height, the supportable mass is about 0.4 gm/sq cm.

If Mr is 400 and t is 0.05 micron, $$H_{max} = 2\pi M[1 - e^{-kt}] = 400 \text{ Oe}$$

if the recorded wavelength is about 1.5 microns. The levitated slider has comparable support capability if data is sufficiently averaged.

The levitation bearing like many air bearings, requires an external load force be applied to establish the equilibrium spacing. For 400 Oe and 2 microinch spacing, the nominal load would be about 10 grams weight of force per square centimeter. The maximum force capability of the levitation bearing at small clearance would be about 27 grams weight of force per square centimeter.

The nominal stiffness at 2 microinches is about $7.8 \times 10^5$ dynes/cm per sq cm or 7800 N/m per sq cm.

This calculation has shown that the levitation stiffness is adequate for a practical combination of recorded wavelengths and spacings if material parameters are chosen appropriately. In particular, the penetration depth of the superconductor should be not much greater than the desired head-medium spacing, h, the first critical field $H_{c1}$ should be larger than the field from the recorded medium, and the maximum distance between recorded transitions should be about $\pi \times (2h + \lambda)$.

While the invention has been particularly shown and described with reference to a preferred embodiment thereof it will be understood by those skilled in the art that various other changes in the form and details may be made therein without departing from the spirit and scope of the invention.

Having thus described our invention, what we claim as new, and desire to secure by Letters Patent is:

1. A slider assembly for supporting a magnetic transducer at a predetermined uniform spacing with respect to the surface of a magnetic recording medium comprising:
   a magnetic recording medium having magnetically recorded data on a surface thereof;
   a slider body having first and second surfaces, said first surface positioned to face the surface of said magnetic recording medium;

a layer of a superconducting material on said first surface of said slider, said superconducting material having a critical temperature below which superconducting properties are exhibited;

a magnetic transducer supported on said second surface of said slider body;

means for maintaining said slider assembly in a vacuum of a predetermined level; and means for cooling said slider assembly to a temperature below the critical temperature of said superconductor material whereby said slider and said magnetic transducer are levitated to a predetermined small uniform spacing above the surface of said magnetic recording medium due to magnetic forces between the magnetized magnetic recording medium and said layer of superconducting material.

2. The slider assembly of claim 1 wherein said means for cooling said slider assembly cools said assembly to a temperature of about 77 degrees K.

3. The slider assembly of claim 2 wherein said layer of superconducting material comprises a material having a critical temperature above 77 degrees K.

4. The slider assembly of claim 3 wherein said layer of superconducting material comprises an oxide ceramic superconductor.

5. The slider assembly of claim 4 wherein said layer of superconducting material comprises a material taken from the group consisting of Rare Earth Barium Copper Oxides (R Ba2 Cu3 O7), with the rare earth material R being Y, Nd, Sm, Eu, Gd, Dy, Ho, Er, Tm, Yb or Lu; Calcium Lanthanum Barium Copper Oxide (Ca La Ba Cu3 O7); and Bismuth Strontium Calcium Copper Oxide compounds.

6. The slider assembly of claim 1 wherein said magnetically recorded data comprises run length limited coded data.

7. A slider assembly for supporting a magnetic transducer at a predetermined uniform spacing with respect to the surface of a relatively moveable magnetic recording medium comprising:

a magnetic recording medium having magnetically recorded data on a surface thereof;

a slider body having first and second surfaces, said first surface having a predetermined contour and being positioned to face the surface of said magnetic recording medium;

a layer of a superconducting material on said first surface of said slider, said superconducting material having a critical temperature below which superconducting properties are exhibited;

a magnetic transducer supported on said second surface of said slider body;

means for maintaining said slider assembly in the presence of a predetermined gas; and means for cooling said slider assembly to a temperature below the critical temperature of said superconductor material whereby said slider and said magnetic transducer are levitated to a predetermined small uniform spacing above the surface of said magnetic recording medium due to the magnetic forces between the magnetized magnetic recording medium and said layer of superconducting material and the slider assembly is then maintained at a desired spacing above the surface of said magnetic recording medium due to the combined effects of said magnetic forces and the aerodynamic forces produced by relative motion in said predetermined gas on said predetermined contour of said slider assembly.

8. The slider assembly of claim 7 wherein said means for cooling said slider assembly cools said assembly to a temperature of about 77 degrees K.

9. The slider assembly of claim 8 wherein said layer of superconducting material comprises a material having a critical temperature above 77 degrees K.

10. The slider assembly of claim 9 wherein said layer of superconducting material comprises an oxide ceramic superconductor.

11. The slider assembly of claim 10 wherein said layer of superconducting material comprises a material taken from the group consisting of Rare Earth Barium Copper Oxides (R Ba2 Cu3 O7), with the rare earth material R being Y, Nd, Sm, Eu, Gd, Dy, Ho, Er, Tm, Yb or Lu; Calcium Lanthanum Barium Copper Oxide (Ca La Ba Cu3 O7); and Bismuth Strontium Calcium Copper Oxide compounds.

12. The slider assembly of claim 7 wherein said predetermined gas is helium.

13. The slider assembly of claim 7 wherein said first surface of said slider body is shaped to enhance the aerodynamic characteristics of said slider within said predetermined gas.

14. The slider assembly of claim 7 wherein said magnetically recorded data comprises run length limited coded data.

15. A magnetic recording disk file comprising:

a rotatable magnetic recording disk having magnetically recorded data on a surface thereof;

a slider body having first and second surfaces, said first surface positioned to face said surface of said magnetic recording disk;

a layer of a superconducting material on said first surface of said slider;

means for maintaining said superconducting material at a temperature below the critical temperature at which superconducting properties are exhibited;

a magnetic transducer supported on said second surface of said slider body;

an actuator attached to said slider body for moving said slider body and said supported magnetic transducer generally radially with respect to said magnetic recording disk; and means for maintaining said slider body in a vacuum of a predetermined level, wherein said slider body and said magnetic transducer are levitated to a predetermined small uniform spacing above said surface of said magnetic recording disk due to magnetic forces between the magnetized magnetic recording disk and said layer of superconducting material.

16. A magnetic recording disk file comprising a rotatable magnetic recording disk having magnetically recorded data on a surface thereof;

a slider body having first and second surfaces, said first surface having a predetermined contour, and being positioned to face said surface of said magnetic recording disk;

a layer of a superconducting material on said first surface of said slider;

means for maintaining said superconducting material at a temperature below the critical temperature at which superconducting properties are exhibited;

a magnetic transducer supported on said second surface of said slider body;

an actuator attached to said slider body for moving said slider body and said supported magnetic transducer generally radially with respect to said magnetic recording disk; and means for maintaining said slider body in the presence of a predetermined gas, wherein said slider body and said magnetic transducer are levitated to a predetermined small uniform spacing above said surface of said magnetic recording disk due to the magnetic forces between the magnetized magnetic recording disk and said layer of superconducting material and the slider assembly is then maintained at a desired spacing above the surface of said magnetic recording medium due to the combined effects of said magnetic forces and the aerodynamic forces produced by relative motion in said predetermined gas on said predetermined contour of said slider assembly.

* * * * *